May 1, 1962 W. J. BLAZEK ET AL 3,032,376
MASTER LINK FOR CRAWLER VEHICLE TRACKS
Filed Dec. 28, 1959 2 Sheets-Sheet 1

INVENTORS.
WILLIAM J. BLAZEK
JAMES J. STRNAD
BY- MAHONEY, MILLER & RAMBO
BY- W. L. Rambo
ATTORNEYS.

INVENTORS.
WILLIAM J. BLAZEK
JAMES J. STRNAD
BY- MAHONEY, MILLER & RAMBO
BY-
ATTORNEYS.

United States Patent Office 3,032,376
Patented May 1, 1962

3,032,376
MASTER LINK FOR CRAWLER VEHICLE TRACKS
William J. Blazek, New Lexington, and James J. Strnad, Bedford, Ohio, assignors to Lempco Products, Inc., Bedford, Ohio, a corporation of Ohio
Filed Dec. 28, 1959, Ser. No. 862,143
3 Claims. (Cl. 305—58)

This invention relates to a master link for crawler vehicle tracks. It has to do, more particularly, with a master coupling link used in detachably connecting the adjacent ends of an articulated crawler vehicle track so as to provide a continuous track.

In the prior art, in detachably connecting the adjacent ends of a crawler vehicle track, it is usual to employ a link structure in which a special or master pin is required and this is of substantially different structure than the standard pin used for hingedly connecting all the other links of the track together. The reason for employing a special or master pin is to permit ease in connecting and disconnecting the track, which requires ease in removal and replacement of the master pin as distinguished from the standard pivot or hinge pins which must be driven into and out of connecting relationship with the associated links.

According to this invention there is provided a master link for detachably connecting adjacent links of an articulated track of the crawler type, which is of a very simple and rugged construction and which employs the usual or standard pivot pin as distinguished from a special master pin.

Another object of this invention is to provide a master link of the type indicated which employs a standard pin but which is so designed as to permit ease in installation and removal without the application of a driving force to the pin.

A further object of this invention is to provide a master link using a standard pin for connecting it to an adjacent track link, which is so designed and constructed that the pin will be effectively locked in place after installation to pivotally connect the adjacent links without "play."

Another object of this invention is to provide a master link using a standard pivot or hinge pin, the link being so designed and constructed that there will be less tendency for dirt and other extraneous matter to enter the link structure around the pin but even if such matter does enter, it will not interfere with quick and easy removal of the pin to disconnect the adjacent links.

Various other objects will be apparent as this description progresses.

The accompanying drawings illustrate the master link of this invention incorporated in one type of articulated track but it is to be understood that it is not limited specifically to the type of track shown.

Figure 1:
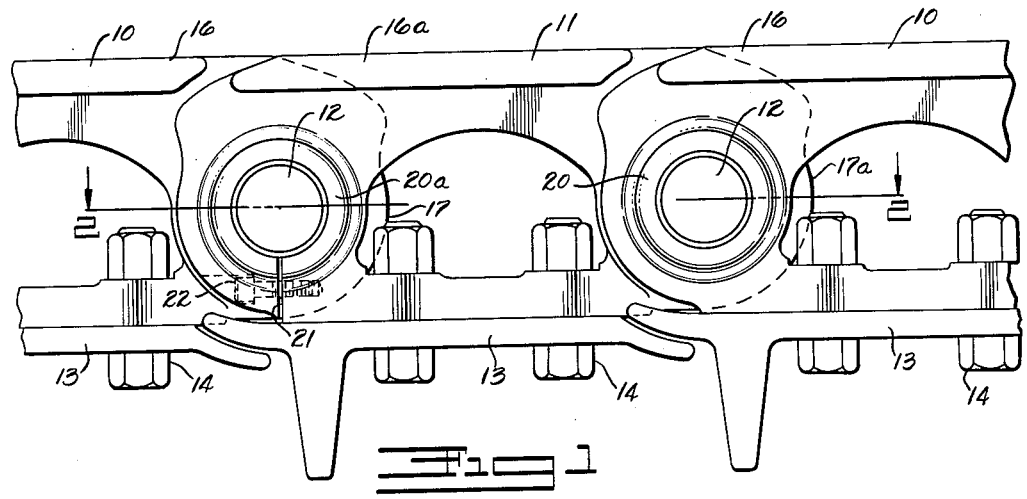
Figure 2:
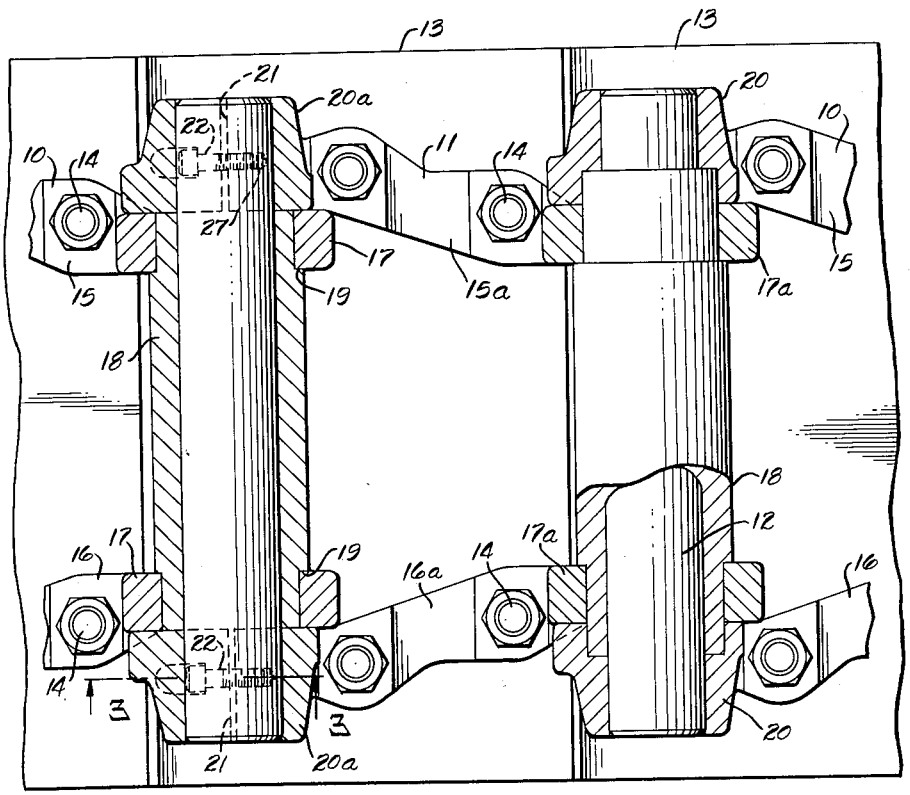
Figure 3:
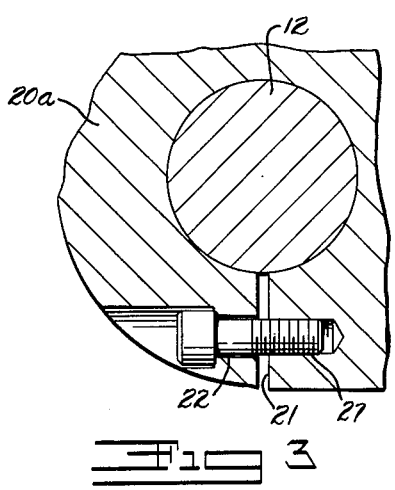
Figure 4:
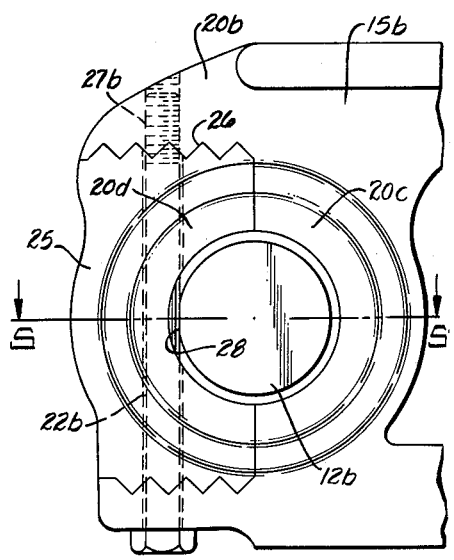
Figure 5:
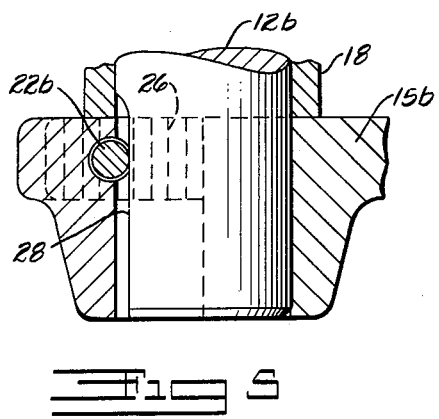
Figure 7:
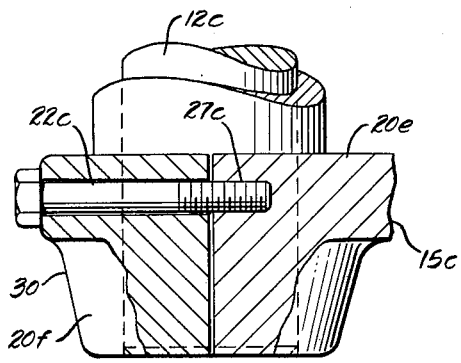
Figure 6:
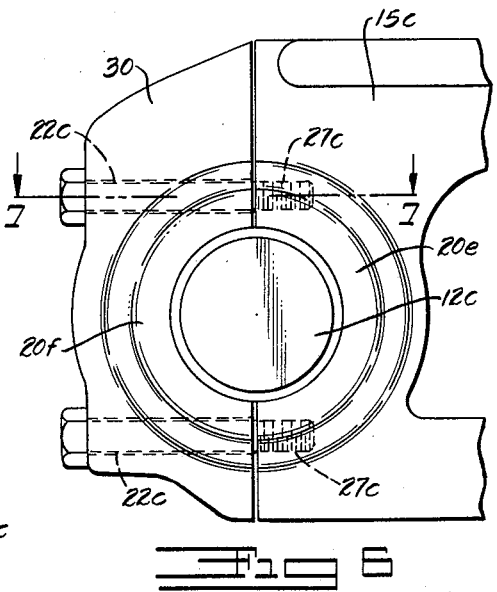

In the drawings:
FIGURE 1 is a side elevational view of a track in which the master link of this invention is incorporated.
FIGURE 2 is a horizontal sectional view taken along line 2—2 of FIGURE 1.
FIGURE 3 is a vertical sectional view taken along line 3—3 of FIGURE 2.
FIGURE 4 is a side elevational view of a portion of a link illustrating a modification of the link.
FIGURE 5 is a sectional view taken along line 5—5 of FIGURE 4.
FIGURE 6 is a view similar to FIGURE 4 illustrating another modification of the link.
FIGURE 7 is a sectional view taken along line 7—7 of FIGURE 6.

With specific reference to the drawings, this invention is shown applied to a crawler type vehicle track which includes double link structures 10 which are detachably coupled or connected together by the master link structure 11 of this invention. All of the link structures 10 and 11 are pivoted together by transverse hinge or pivot pins 12 to provide a continuous track. All of these pins 12 are identical and can be of a standard type. The track includes the ground-engaging grouser plates or shoes 13 which are carried by the link structures 10 and 11 and which are bolted thereto by the bolts 14.

As shown in FIGURE 2, the double link structures 10 are of the usual form and the double link structure 11 for coupling the link structures 10 together is of similar construction and the adjacent ends of these links overlap each other. The links 10 include the link members 15 and 16 which are identical with each other but which are arranged in opposed relationship, being right and left hand link members. The master link structure 11, according to this invention, is similar in that it comprises right and left hand opposed link members 15a and 16a. The link members 15 and 16 at one end are provided with bushing receiving eyes or collars 17. These eyes receive the reduced ends of the pivot bushing 18. Shoulders 19 are provided on the bushing 18 to limit axial movement relative to the eyes 17. The bushing 18 is normally non-rotatably disposed, as by press-fitting, within the eyes 17.

The pivot bushing 18 rotatably receives the pivot or hinge pin 12 and the pin extends outwardly from each end thereof. The master link members 15a and 16a, at the ends thereof adjacent the eyes 17, are provided with eyes or collars 20a preferably formed integrally thereon. These eyes 20a receive the projecting ends of the pin 12 which are non-rotatably clamped therein.

The opposite ends of the links 15a and 16a have the eyes 17a thereon, preferably integrally formed, and these eyes 17a are disposed laterally between the eyes or bosses 20 formed on the opposite ends of the adjacent link members 15 and 16. A pivot bushing 18 is mounted in the eyes 17a in the same manner as the bushing 18 is secured within the eyes 17 as previously described. This bushing 18 receives a pin 12 which extends outwardly into the eyes 20.

As indicated above, the projecting ends of the pin 12 which extend into the master link eyes 20a are non-rotatably clamped in position and are also prevented from moving axially relative thereto. The clamping arrangement provided according to this invention is simple yet effective and provides for ease in removing and replacing the pin 12 relative to the master link structure 11 and particularly relative to the eyes 20a thereof. This clamping arrangement is provided by splitting the eye 20a transversely along a radially extending joint 21. Thus, a split collar or eye is provided for embracing the pin 12, it being understood that the split is sufficiently wide to permit drawing of the collar or eye around the associated end of the pin 12 in clamping relationship. The eye or collar 20a is clamped around the pin by means of a clamping bolt 22 which extends chordally through the collar and across the split thereof. This bolt 22 extends through an end of the collar and is tapped into the other end thereof as indicated at 27. It will be apparent that by means of the bolt 22, the split collar 20a can be drawn tightly around the pin 12 or can be released therefrom. Thus, a clamping arrangement is provided which will hold a standard pin 12 in operative position between the master link 11 and an associated standard link structure 10. Furthermore, the clamping arrangement is such that the master link members 15a and 16a may be easily produced from link members of standard form and which need be modified only slightly by providing the slit 21 and the bore for receiving the bolt 22. The pin 12 used in association with the eyes 20a of the master link structure 11 will be identical with the other standard pins 12 used at the other pivot or hinge connections of the chain.

In FIGURE 4, there is illustrated a modification of the structure for retaining the pivot or hinge pin in the master link structure. In this instance, the eye 20b on each master link, indicated by the numeral 15b, is of different form. The link member 15b is provided with a removable section or insert 25 which removably fits within the bifurcated outer end of the link body. Half of the eye is formed on the body of the link, as indicated at 20c, and the other half is formed on the insert member 25, as indicated at 20d. With the member 25 in position, these sections 20c and 20d will closely surround the end of the standard pin 12b. The insert member 25 slides laterally into and out of the bifurcated end of the link member 15b and complemental serrated or rib surfaces 26 are provided for preventing outward displacement of the member from the end of the link 15b. To retain the member laterally in position within the bifurcated end of the link member 15b, a bolt 22b is provided. This bolt extends through aligning bores in the ends of the link 15b and the member 25, being tapped into one of the bifurcations of the link, as indicated at 27b, the bores extending substantially tangentially of the pin 12b.

To prevent axial or rotative movement of the pin 12b within the eye 20b, the bolt 22b is disposed in substantially tangential contacting relationship with the pin 12b. The pin 12b is preferably provided at its adjacent surface with a flat transverse shoulder 28 extending chordally of the pin which is engaged by the side of the bolt 22b. This shoulder or flat surface 28 may be provided by flattening the pin 12b, such as by grinding, or by producing a transverse groove such as by drilling. It will be apparent that the bolt 22b will have its side in engagement with the chordal flat 28 to prevent both rotative and axial movement thereof relative to the eye 20b. Alternately and preferably, the pin and bolt are not flatted and are out of contact with each other. The serrations will cam the insert tightly against the pin when the bolt is tightened and such tightening also constricts the eye proper to further grip the pin.

A different clamping arrangement for clamping the hinge or pivot pin in the ends of the master link members is illustrated in FIGURES 6 and 7. In this instance, the clamping arrangement comprises a clamping eye section or segment 20e which is formed on the end of the link member indicated by the numeral 15c. Cooperating with this eye segment 20e is an eye segment 20f formed on a clamp member or cap member 30 mounted on the outer end of the link member 15c. The cap member 30 is retained in position on the end of the link 15c in clamping relationship to the standard pin 12c by means of clamping bolts 22c which pass through bores in the member 30 and are tapped into the outer end of the link member 15c as indicated at 27c. It will be apparent that removal and replacement of the cap member 30 of the eye 20f will permit removal and replacement of the pin 12c which may be of a standard form.

It will be apparent that according to this invention, as described above, there is provided a master link for use between the usual links of a track of the crawler type for vehicles. Because of the nature of this master link, it is possible to use standard pivot or hinge pins in association therewith. The hinge or pivot pins are associated with the master links in such a manner that they can be removed and replaced with ease without the use of driving force. This is accomplished by providing means at the pin-receiving eyes of the master links for engaging and gripping the pivot or hinge pin to prevent relative rotation and axial movement. In each form of this invention, the pin-receiving eye of the link member is formed of relatively movable sections which can be positioned in surrounding relationship with the pin and which carry surfaces for engaging the pin to prevent axial movement thereof, means being provided on the eye for retaining the sections in such surrounding relationship to the pin and being adjustable to permit relative movement of said sections to release the pin.

The master link structure of this invention is of very simple and rugged construction and is so designed as to permit ease in installation and removal of the standard pin used in association therewith. The pin will be effectively locked in position after installation but can be removed with ease and this removal will not be interfered with even if there is an accumulation of dirt or other matter at the ends of the pin.

According to the provisions of the patent statues, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. In a crawler vehicle track of the type including a plurality of individual links hingedly connected to one another by coaxial pin and bushing elements; a master link for detachably connecting the end links of the track comprising a link body formed at one end thereof with a closed eye portion for the reception of a bushing element and at its opposite end with a split eye portion for the reception of a pin element, the split eye portion of said body being defined by relatively movable segments; and adjustable means connected between said relatively movable segments for releaseably holding said segments in clamping engagement with a pin element received in said split eye.

2. The combination as defined in claim 1, wherein said link body is of integral one piece construction and the relatively movable segments which define the split eye portion of said body are separated by a single slit extending radially from said split eye portion, and wherein said adjustable means comprises a screw-threaded bolt rotatably carried by one of said segments and threadedly engaged with the other of said segments and extending across said slit.

3. The combination as defined in claim 1, wherein one of said relatively movable segments is physically separable from the remainder of said link body, and wherein said adjustable means comprises a threaded bolt arranged to connect said segments and to draw the same into clamping engagement with a pin received in the split eye portion of said link body.

References Cited in the file of this patent

UNITED STATES PATENTS

| | | |
|---|---|---|
| 499,525 | Dodge | June 13, 1893 |
| 1,039,991 | Morton | Oct. 1, 1912 |
| 1,684,918 | Jereczek | Sept. 18, 1928 |
| 2,283,936 | Knox | May 26, 1942 |
| 2,318,683 | Galanot et al. | May 11, 1943 |
| 2,882,102 | Rund | Apr. 14, 1959 |

FOREIGN PATENTS

| | | |
|---|---|---|
| 555,567 | Germany | Apr. 10, 1930 |